A. E. DUPELL.
DETACHABLE FITTING FOR SYRINGES.
APPLICATION FILED JAN. 13, 1915.
1,145,758.
Patented July 6, 1915.
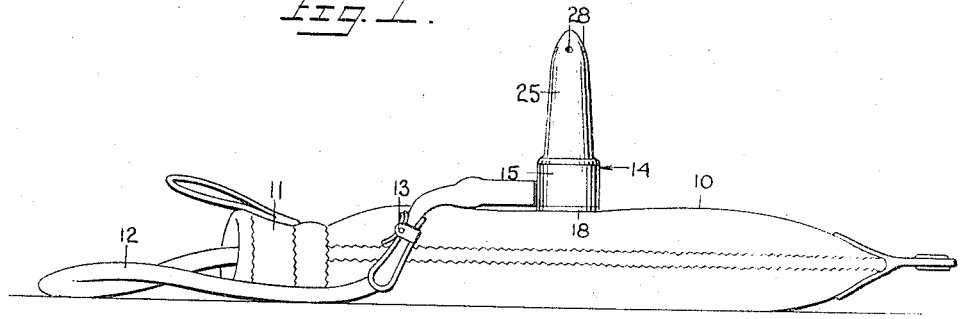
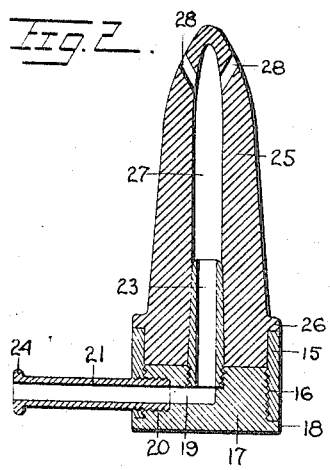
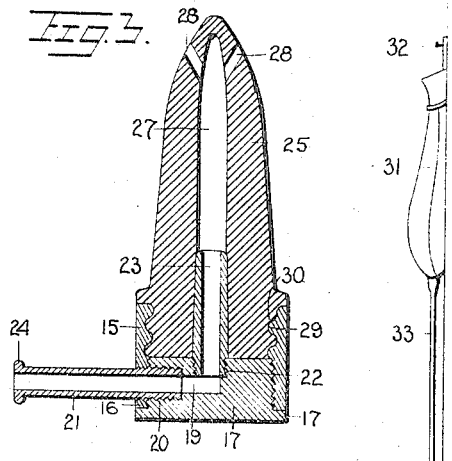
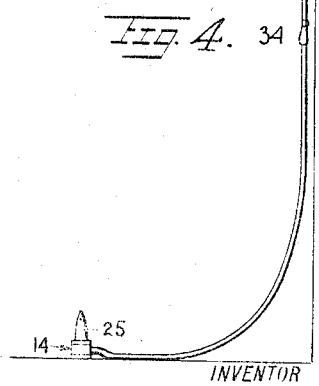
WITNESSES:
H. J. Walker
J. Edwin Burch
INVENTOR
Alonzo E. Dupell
BY Munn & Co
ATTORNEY

UNITED STATES PATENT OFFICE.

ALONZO ERWIN DUPELL, OF NEW YORK, N. Y.

DETACHABLE FITTING FOR SYRINGES.

1,145,758.     Specification of Letters Patent.     Patented July 6, 1915.

Application filed January 13, 1915. Serial No. 1,948.

*To all whom it may concern:*

Be it known that I, ALONZO E. DUPELL, a citizen of the United States, and a resident of the city of New York, borough of Brooklyn, in the county of Kings and State of New York, have invented a new and Improved Detachable Fitting for Syringes, of which the following is a full, clear, and exact description.

This invention relates to improvements in syringes for sanitary purposes and more particularly to an improved detachable fitting therefor.

The primary object of the invention is comprehended in the provision of a device of the class described by which the several parts composing the same can be readily taken apart so as to permit the cleansing thereof, the packing thereof in a compact space for transportation or the application of various styles of nozzles and particularly a cone-shaped flexible rubber nozzle.

A further object of the invention is the provision of a fitting or syringe for use therewith as an intestine cleanser or douche which includes a flexible water bag, the mouth portion of which is adapted to receive a plug having a flexible tube connected thereto, while attached to the free end of the tube is the fitting above specified for use in forcing the cleansing fluid under pressure of the body or as a fountain, means being provided for controlling the flow of the fluid through the tube.

With the above and other objects in view, the invention resides in the peculiar combination and arrangement of parts to be hereinafter more fully described, illustrated and claimed, it being also an object to provide a device which is simple in construction, durable and efficient.

Reference is to be had to the accompanying drawings forming a part of this specification, in which similar characters of reference indicate corresponding parts in all the views and in which—

Figure 1 is a side elevation of a pressure syringe showing one use of the improved fitting; Fig. 2 is an enlarged vertical sectional view thereof; Fig. 3 is a similar view of a modified construction; and Fig. 4 is a view illustrating a fountain syringe employing the fitting.

As illustrated in the drawings, the numeral 10 designates the usual form of water bag made of rubber or rubber cloth having a screw threaded filling opening or mouth 11 and which is otherwise imperforate. Designed for connection with the bag to communicate with the interior thereof by means of the usual stopper is a flexible tube or pipe 12 which is adapted to carry a valve or stop cock 13 for controlling the supply of fluid through the tube. A fitting 14 is designed for attachment to the free end of the tube and as illustrated comprises a cylindrical shell 15 interiorly threaded at the bottom as shown at 16 for removably attaching a bottom portion 17 thereto, the bottom portion having the threads inset to provide a bottom flange 18 which contacts with the lower edge of the shell when the parts are connected. The bottom portion 17 is tapped from the side to produce a lateral passage 19, the shell being correspondingly tapped and both threaded as shown at 20 in order to provide for the removable attachment of a reduced lateral extension 21 thereto. The bottom portion 17 is also centrally tapped and threaded vertically, as shown at 22, to provide for the removable engagement of an upwardly extending discharge tube 23 which is positioned concentrically relatively to the shell of the fitting in such a manner as to establish a continuous bore at right angles through the bottom portion and with the lateral extension 21. This lateral extension is designed for engagement by the tube 12 and is provided with an external bead 24 at its free extremity to prevent displacement of the tube. In this manner a nozzle such as a cone-shaped soft or flexible rubber nozzle 25 may be removably engaged in the fitting or shell 15 forming the body thereof to contact with the top or upper face of the bottom portion 17, there being an external rib 26 on the nozzle to contact with the upper edge of the shell so as to assist in holding the nozzle in position in connection with the frictional engagement thereof with the interior wall of the shell. When the nozzle is so applied the discharge tube 23 will pass into the opening 27 of the nozzle, and the discharge tube 23 is made slightly tapered so as to readily fit into this opening which is also tapered, and when used as shown in Fig. 1 of the drawings pressure will be applied directly to the bag by the body, the fitting being sufficiently small to obviate pressure against the body or injury at the applied part. The fluid will be discharged through the escape openings 28 at the free end of the nozzle.

In Fig. 3 of the drawings the structure is the same as that described in Fig. 2 except that the shell 15 is interiorly threaded as shown at 29 and the nozzle exteriorly threaded as shown at 30 to engage therewith. By this construction the removal of the soft rubber nozzle renders the fitting interchangeable in that the ordinary hard rubber nozzles having exteriorly threaded attaching ends can be used.

Either of the devices as described may be used in the manner shown in Fig. 1 of the drawings or as a fountain syringe as shown in Fig. 4, in which a water bag 31 is illustrated suitably suspended as shown at 32. The bag is provided with a discharge pipe or tube 33 leading from the bottom thereof and carrying a stop cock or valve 34 to control the supply of the water or fluid, and the fitting is attached to the free end of the tube so that the flow of the water or fluid is by gravity under a hydrostatic pressure head. The fitting is relatively small and is entirely portable so as to be used as a handle for applying the nozzles without causing the hands to come in contact with the body and thus obviate infection.

The device is used as an intestine cleanser to flood the colon or as a vaginal douche, the discharge tube 23 being anointed before use, and the flexibility of which causes it to accommodate itself to the various positions of the body without injuring the latter or displacing the device. Another important feature is the fact that, with the fitting described, the device is adapted for use with equal facility as a force-feed syringe, as shown in Fig. 1, or a fountain syringe, as shown in Fig. 4, this being due to the fact that the shell is of even diameter with the nozzle and permits the latter to be applied with impunity between the legs without injury to the person and will be accommodated where a large device could not, no pressure being exerted by the fitting.

Having thus described my invention, what I claim as new and desire to secure by Letters Patent is:—

1. A medical appliance of the class described, comprising the combination with a water bag having an outlet and a flexible tube leading therefrom; of a fitting comprising a small cylindrical shell having a thickened bottom provided with a small passage extending vertically and horizontally therethrough, said fitting having a lateral tubular extension the bore of which communicates with said passage and a central tube leading from said vertical passage, said bottom being removably connected with said shell.

2. A detachable fitting for syringes, comprising a cylindrical shell open at both ends and interiorly threaded in one end, a bottom portion threaded therein and having a bottom flange contacting with the adjacent edge of the cylindrical shell, said bottom portion having an angular passage therethrough leading centrally from its top face and laterally through its threaded portion and the cylindrical shell, a lateral extension threaded in the last named portion and a discharge tube leading vertically from the vertical portion of the passage in the bottom portion.

3. A detachable fitting for syringes, comprising a cylindrical shell open at both ends and interiorly threaded in one end, a bottom portion threaded therein and having a bottom flange contacting with the adjacent edge of the cylindrical shell, said bottom portion having an angular passage therethrough leading centrally from its top face and laterally through its threaded portion and the cylindrical shell, a lateral extension threaded in the last named portion, a discharge tube leading vertically from the vertical portion of the passage in the bottom portion, said discharge tube extending above the cylindrical shell, and a cone-shaped flexible nozzle having a central passage, said nozzle being fitted inside of said cylindrical shell and receiving said discharge tube therein, whereby displacement of the nozzle is prevented, said nozzle contacting with the upper edge of the cylindrical shell.

In testimony whereof I have signed my name to this specification in the presence of two subscribing witnesses.

ALONZO ERWIN DUPELL.

Witnesses:
MABEL F. BLUEM,
ALBERT A. WATTS.